(12) United States Patent
Daniau et al.

(10) Patent No.: US 8,516,788 B2
(45) Date of Patent: Aug. 27, 2013

(54) PULSE DETONATION ENGINE OPERATING WITH AN AIR-FUEL MIXTURE

(75) Inventors: Emeric Daniau, St Florent sur Cher (FR); François Falempin, St Arnoult (FR); Etienne Bobo, Bourges (FR); Jean-Pierre Minard, Soye en Septaine (FR)

(73) Assignee: MBDA France, Paris (FR)

( * ) Notice: Subject to any disclaimer, the term of this patent is extended or adjusted under 35 U.S.C. 154(b) by 892 days.

(21) Appl. No.: 12/667,486

(22) PCT Filed: Jun. 19, 2008

(86) PCT No.: PCT/FR2008/000855
§ 371 (c)(1),
(2), (4) Date: Dec. 31, 2009

(87) PCT Pub. No.: WO2009/013403
PCT Pub. Date: Jan. 29, 2009

(65) Prior Publication Data
US 2010/0186370 A1   Jul. 29, 2010

(30) Foreign Application Priority Data

Jul. 2, 2007  (FR) ..................................... 07 04756

(51) Int. Cl.
 *F02C 5/02* (2006.01)
(52) U.S. Cl.
 USPC ........................... 60/39.38; 60/39.76; 60/247

(58) Field of Classification Search
 USPC ..... 60/39.38, 39.76, 39.77, 247, 39.78; 431/1
 See application file for complete search history.

(56) References Cited

U.S. PATENT DOCUMENTS

| | | | |
|---|---|---|---|
| 7,131,260 B2* | 11/2006 | Dean et al. | 60/39.76 |
| 7,669,406 B2* | 3/2010 | Tangirala et al. | 60/247 |
| 2005/0120700 A1 | 6/2005 | Tangirala | |
| 2005/0279078 A1 | 12/2005 | Dean | |
| 2005/0279083 A1* | 12/2005 | McManus et al. | 60/247 |
| 2007/0144179 A1 | 6/2007 | Pinard | |

FOREIGN PATENT DOCUMENTS

FR   2 863 314   6/2005

OTHER PUBLICATIONS

International Search Report dated Mar. 3, 2009 with English Translation.
Written Opinion of the International Searching Authority with English Translation.
A. Putnam, et al., "Pulse Combustion," Progress in Energy and Combustion Science, vol. 12, XP000907675, 1986, pp. 43-79.

* cited by examiner

*Primary Examiner* — Andrew Nguyen
(74) *Attorney, Agent, or Firm* — Dickinson Wright PLLC

(57) ABSTRACT

The invention relates to a pulse detonation engine operating with an air-fuel mixture. According to the invention, the engine (1) includes at least two predetonation tubes (4, 5) which operate under conditions close to thermal cutoff conditions and the shock waves from which are focused in the combustion chamber (19).

7 Claims, 2 Drawing Sheets

PULSE DETONATION ENGINE OPERATING WITH AN AIR-FUEL MIXTURE

The present invention relates to pulse detonation engines operating with an explosive air-fuel mixture ignited using low-energy ignition means, for example like an internal combustion engine spark plug.

In a known pulse detonation engine of this type, there is at least one predetonation tube of a diameter smaller than that of the combustion chamber of said engine, said predetonation tube opening into said combustion chamber and being provided with said low-energy ignition means arranged at one end of said predetonation tube.

When the explosive air-fuel mixture contained in said predetonation tube is initiated by said low-energy ignition means, there is created in this tube a laminar flame regime characterized by a very low speed of propagation, of the order of a few cm/s to a few m/s.

As such a flame propagates through the predetonation tube, there is initially seen an acceleration connected with the expansion of the products of combustion (which have a lower density than the fresh gases) through a "piston" effect, which causes the flame front to destabilize, folding (through the effect of viscosity and boundary layers at the walls), the flame therefore becoming turbulent; its surface area increases, as does the rate of release of energy, this all further contributing to increasing its acceleration.

The speed of the flame thus switches from a few cm/s to a few hundred m/s and reaches the regime known as the "thermal blockage" regime. The flame then propagates at a speed close to the speed of sound with respect to the burnt gases, namely of the order of 800 m/s to 900 m/s for an air-fuel environment.

This very great rapidity leads to strong pressure waves in the fresh gases, measuring the order of a few bar.

A propagation regime such as this is relatively unstable and may progress toward a detonation regime. Unlike the previous acceleration, this transition is sudden (termed an "explosion within an explosion"), the pressure wave becoming a shockwave and the rapidity of the flame passing from 800-900 m/s to 1800-2000 m/s.

This entire phenomenon is known as a "deflagration-detonation transition" and experience has shown that, in the case of a plain tube, the distance needed in order to observe the phenomenon is of the order of a few meters to a few tens of meters, depending on the mixtures used.

In order to reduce this distance (and the time) needed to obtain a deflagration-detonation transition as far as possible, it is therefore necessary to facilitate the transition from a laminar flame to a turbulent flame and then to attain the thermal blockage regime as quickly as possible and finally bring about the "explosion within an explosion".

To do this, one very widely used technique is the technique that consists in using a spiral (known as a "Shchelkin spiral") or obstacles in the form of roundels uniformly spaced in order artificially to increase the turbulence in the predetonation tube.

In this way, the length that the predetonation tube needs to have can be reduced to 20-30 times the diameter $d_1$ thereof.

In all cases, the "blockage ratio" is defined as being the ratio between the passage cross section delimited by the obstacle and the passage cross section of said predetonation tube.

It has been shown experimentally that the best blockage ratio ranges between 0.45 and 0.5 with a spacing corresponding to one times the diameter.

Although it is generally assumed that the shockwave of the detonation is planar and occupies the entire cross section of the predetonation tube, in actual fact several longitudinally and transversely propagating shockwaves are formed, the transverse waves colliding periodically.

A detonation wave therefore has a three-dimensional structure, this structure being very much dependent on the dynamics of the decomposition of the explosive mixture, and therefore on the characteristic time of the chemical reaction.

The points situated at each intersection between the main detonation wave and the transverse waves are termed "triple points", the path of these triple points defining a periodic structure known as a "detonation cell" of which the length L and the width $\lambda$ (approximately equal to 0.6 to 0.7 L) are correlated with the characteristic time limiting chemical reactions in the explosive mixture, that is to say, in essence, its induction time.

In order for an autonomous and steady detonation to propagate through a predetonation tube, it is necessary for the diameter of this tube to be greater than the width $\lambda$ of the detonation cell. Detonations known as "marginal" detonations may propagate along tubes of smaller dimensions, but these phenomena are relatively unstable and require special conditions.

The cell width $\lambda$ of the air-fuel mixtures (for richnesses of around about the stoichiometric richness) is of the order of 50 mm to 60 mm (with the notable exception of methane which has a cell size of over 280 mm and of certain gaseous alkenes and alkynes such as ethylene and acetylene), and this therefore sets a minimum condition on the diameter $d_1$ of a predetonation tube intended to support the propagation of a detonation wave.

If a detonation has been able to form in said predetonation tube—which assumes that said diameter $d_1$ thereof is greater than the width $\lambda$ of the detonation cell—this detonation then has to be transmitted to said combustion chamber of which the diameter $d_2$ is far greater than said diameter $d_1$.

It has been found that the quality of the transmission is dependent on a critical value Kc of the ratio between said diameter $d_1$ of the predetonation tube and the width $\lambda$ of the detonation cell. Studies performed initially by Mitrofanov and Soloukhin in the 1960s, then broadened by Moen and Knystautas in the 1980s, indicate that this critical value Kc is equal to 13. It has since been found that this critical value is connected with the regularity of the cellular structure and that it can vary between 13 and 24 depending on the mixtures and their dilutions.

Hence:

if $d_1 > Kc \cdot \lambda$, there is a small amount of decoupling between the shockwave and the flame as it is diffracted between the predetonation tube and the combustion chamber, but the cellular structure of the wave is maintained. The detonation is transmitted unmodified into the combustion chamber of diameter $d_2$;

if $d_1 = Kc \cdot \lambda$, there is decoupling between the shockwave and the flame; however, under certain conditions, the detonation can reignite;

finally, if $d_1 < Kc \cdot \lambda$, the flame is decoupled from the shockwave and the latter is not of sufficient amplitude to reignite the mixture. The shock is attenuated and becomes an acoustic wave. The detonation has been destroyed as it is diffracted between the predetonation tube and the combustion chamber.

It can thus be seen that, in pulse detonation engines of the aforementioned type, the issue is that of initiating detonations in the predetonation tube and of then causing these detonations to progress as far as the combustion chamber of the engine and that this results in significant dimensional constraints as far as the diameter and length of the predetonation tube are concerned, these dimensional constraints making this tube very bulky.

This then leads to significant space problems, especially since, in the known pulse detonation engines, said predetonation tube is installed on the outside of the combustion chamber, in the axial continuation thereof in order to open into this chamber centrally. A geometry such as this is of course bulky and, what is more, raises difficulties in supplying said predetonation tube with air and with fuel.

It is an object of the present invention to overcome these disadvantages.

To this end, according to the invention, an engine with pulsed detonations and controlled ignition, operating on an explosive air-fuel mixture and comprising:
- a combustion chamber closed at one of its ends by a thrust wall, and
- at least two predetonation tubes provided with low-energy ignition means and in communication with said combustion chamber via one of their ends opening into said combustion chamber facing said thrust wall, the arrangement of said predetonation tubes being such that the waves traveling through them are reflected by said thrust wall into said combustion chamber, is notable in that:
- in said predetonation tubes, the flames are brought into a state of propagation close to the conditions of thermal blockage without seeking to attain detonation regime; and
- detonation of said explosive mixture contained in said combustion chamber is initiated at a point of said combustion chamber which is raised to a very high pressure and a very high temperature by the shockwaves generated in said predetonation tubes, then reflected off and focused by said thrust wall at said point.

Thus, according to the present invention, the issue is not that of obtaining detonations in the detonation tubes but simply of obtaining rapid deflagrations. This then avoids the abovementioned sizing disadvantages, the overall sizing of the predetonation tubes implemented by the invention being very much smaller than the sizing of the predetonation tubes used in the prior art. What is more, the engine of the present invention, provided with at least two predetonation tubes, is far more robust than an engine with a single predetonation tube.

In order to reduce the size of the pulse detonation engine according to the present invention, the predetonation tubes are preferably positioned laterally with respect to said combustion chamber, at least approximately along the latter, this additionally making it easier for said predetonation tubes to be supplied with air and with fuel.

In an advantageous embodiment of the present invention, the pulse detonation engine comprises two predetonation tubes in lateral positions that are diametrically opposed with respect to said combustion chamber.

Advantageously, each predetonation tube is open at its opposite end to the end that faces said thrust wall, and said low-energy ignition means are positioned at an intermediate point between these two ends, for example in the middle part of said tube. As a result of such an arrangement, the effect of pressure gradients behind the leading wave is limited and acceleration of the flame in the predetonation tube is encouraged. In addition, said predetonation tubes thus contribute to the thrust of the engine.

For preference, in order to obtain a reliable and uniform ignition, said low-energy ignition means comprise, for each predetonation tube, two diametrically opposed igniter plugs.

In the usual way, in the pulse detonation engine of the invention, successive internal obstacles are provided, these each defining a blockage ratio. According to one feature of the present invention, said internal obstacles are positioned in such a way that said blockage ratios decrease symmetrically from said low-energy ignition means as far as each of said ends of said predetonation tube. Calculation and experience have shown that it is advantageous that:
- on each side of said ignition means, in zones adjacent thereto, the blockage ratio be high, of the order of 0.58 or higher;
- in the zones adjacent to said ends of each predetonation tube, the blockage ratio be low, of the order of 0.25; and
- between said zones adjacent to said ignition means and said zones adjacent to said ends, the blockage ratio be medium, of the order of 0.44.

The figures of the attached drawing will make it easy to understand how the invention may be embodied. In these figures, identical references denote similar elements.

Figure 1:
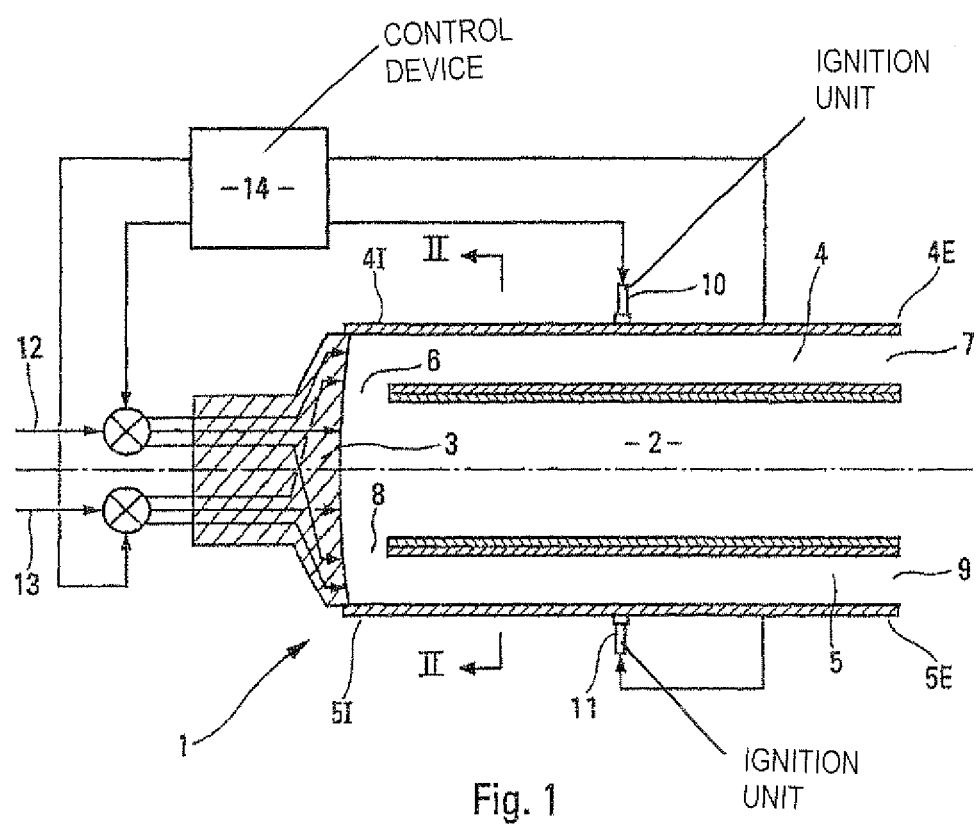
FIG. 1 is a schematic view in axial section of one embodiment of the pulse detonation engine according to the present invention.
Figure 2:
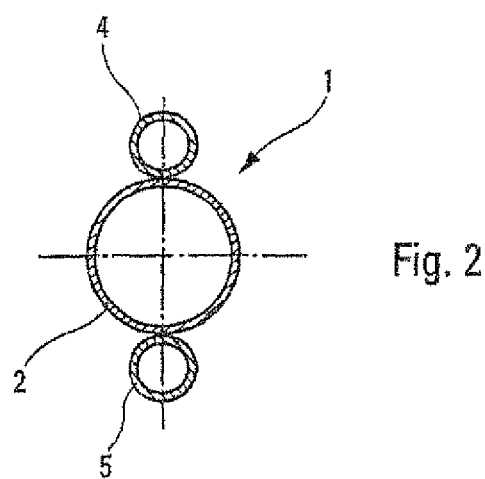
FIG. 2 is a schematic section on II-II of FIG. 1.

The pulse detonation engine 1 according to the present invention and depicted schematically in FIGS. 1 and 2 comprises a combustion chamber 2, closed at one of its ends by a thrust wall 3 and open at its opposite end to this wall. The engine 1 additionally comprises two predetonation tubes 4 and 5 positioned laterally with respect to the combustion chamber 2, in positions that are diametrically opposed with respect to this chamber. Thus, each predetonation tube 4, 5 is positioned along the combustion chamber 2.

The end 4I of the predetonation tube 4, positioned facing the thrust wall 3, opens into the combustion chamber 2 via an orifice 6, while the end 4E of said tube 4, opposite to the thrust wall 3, is open in the form of an orifice 7.

Likewise, the end 5I of the predetonation tube 5 positioned facing the thrust wall 3 opens into the combustion chamber 2 via an orifice 8, while the end 5E of said tube 5, opposite to said thrust wall 3, is open in the form of an orifice 9.

The predetonation tubes 4 and 5 are provided with low-energy ignition means 10 or 11, respectively. The ignition means 10 and 11 are positioned at an intermediate point in the tubes 4 and 5, respectively, preferably in the middle part thereof.

A fuel supply system 12 and an air supply system 13 can supply, the combustion chamber 2 and the detonation tubes 4 and 5.

A control device 14 cyclically drives the ignition means 10 and 11 and the supply systems 12 and 13.

Figure 3:
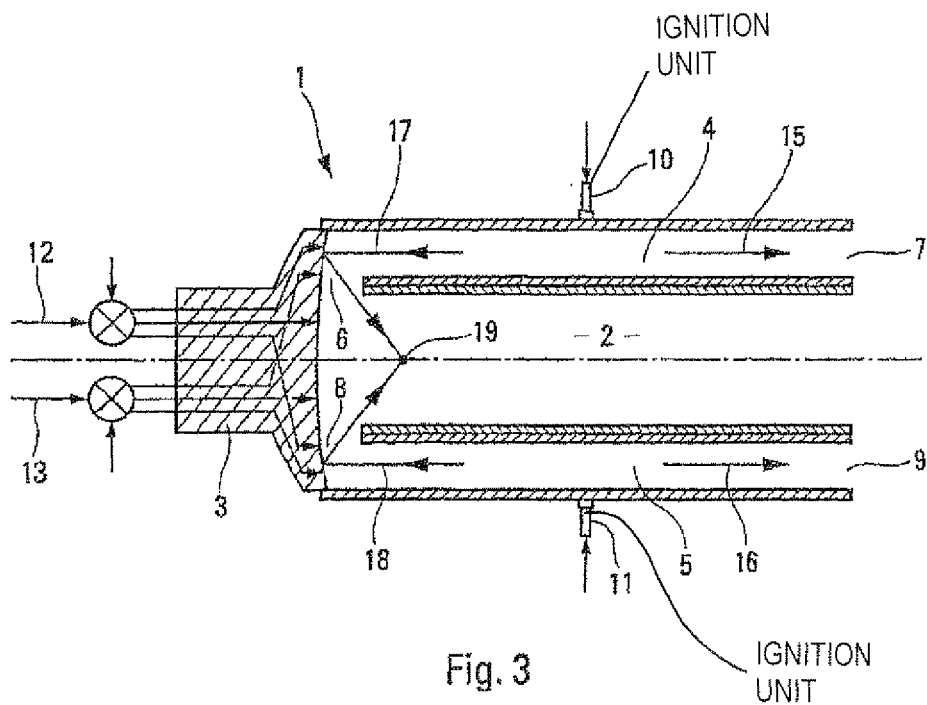
FIG. 3 illustrates the operation of the pulse detonation engine according to the present invention, using a partial depiction of FIG. 1.

For each spark generated by the ignition means 10 and 11 in the predetonation tubes 4 and 5 filled with air-fuel mixture, the latter is the site of deflagration, the flame and thermal wave of which travel at a sonic speed, in both directions, in said predetonation tubes 4 and 5. The respective shockwaves, symbolized by the arrows 15 and 16 in FIG. 3, and which travel toward the orifices 7 and 9 respectively, contribute to the thrust of the engine 1. The respective shockwaves, symbolized by the arrows 17 and 18 in said FIG. 3 and which travel toward the thrust wall 3, are reflected off and focused by the latter toward a point 19 of said combustion chamber 3, passing through the orifices 6 and 8. Thus, the point 19 is raised to a very high pressure and a very high temperature, which pressure and temperature are able to initiate detonation in the air-fuel mixture residing in said combustion chamber 2.

Figure 4:
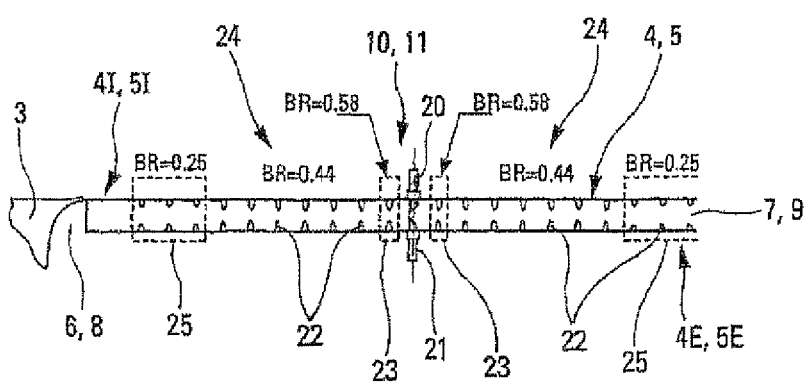
FIG. 4 is a schematic longitudinal section through a predetonation tube for the pulse detonation engine according to the invention.

As shown by FIG. 4, each of the ignition means 10, 11 may advantageously comprise two igniter plugs 20, 21 which are diametrically opposed with respect to the corresponding predetonation tube 4, 5.

FIG. 4 more schematically illustrates the internal obstacles 22 positioned in said predetonation tubes 4 and 5 for regulating the blockage ratio BR along these tubes.

The obstacles 22 situated on each side of the ignition means 10, 11 in the zones 23 have a fairly high blockage ratio (of at least 0.58). The purpose of this is to form a jet of hot gases and therefore obtain a laminar-turbulent transition as rapidly as possible. A higher blockage ratio (ranging up to 0.72) would enhance this effect, but at the expense of the rate of expulsion of the burnt gases. Because this zone is the zone in which the entire device undergoes ignition, it is appropriate to ensure that the least possible amount of burnt gases remains therein.

The next obstacles 22 situated in the intermediate zones 24 have a slightly lower medium blockage ratio (0.44 for example) which is a value considered to be close to the optimum. This series of obstacles needs to allow the flame to be accelerated from a speed of a few tens of m/s up to a few hundred m/s.

The series of obstacles 22 situated in the zones 25 of the ends 4I, 4E; 5I, 5E has a blockage ratio that is even lower still (for example 0.25), because in this zone the flame already has a high speed, which means that too high a blockage ratio would start to carry a penalty in terms of drag.

Focusing the waves from the predetonation tubes 4, 5 and the successive reflections off the thrust wall 3 and off the walls, ensure that the hot spot 19 is formed and that detonation is initiated in the chamber 2, before the returning expansion waves formed at the open end of each ignition tube interfere in a negative way with this initiation phenomenon.

The invention claimed is:

1. An engine with pulsed detonations and controlled ignition, operating on an explosive air-fuel mixture and comprising:
   a combustion chamber closed at one of its ends by a thrust wall, and
   at least two predetonation tubes provided with low-energy ignition unit and in communication with said combustion chamber via one of their ends opening into said combustion chamber facing said thrust wall, the arrangement of said predetonation tubes being such that the waves traveling through them are reflected by said thrust wall into said combustion chamber, wherein:
   in said predetonation tubes, the flames are brought into a state of propagation close to the conditions of thermal blockage without seeking to attain detonation regime;
   detonation of said explosive mixture contained in said combustion chamber is initiated at a point of said combustion chamber which is raised to a very high pressure and a very high temperature by the shockwaves generated in said predetonation tubes, then reflected off and focused by said thrust wall at said point, and
   each predetonation tube comprises successive internal obstacles each defining a blockage ratio, wherein said blockage ratio decreases from said low-energy ignition unit as far as each of said ends of said predetonation tube.

2. The engine as claimed in claim 1, wherein each predetonation tube is open at its opposite end to the facing end that faces said thrust wall, and said low-energy ignition unit is positioned at an intermediate point between the opposite end and the facing end.

3. The engine as claimed in claim 1, wherein said low-energy ignition unit comprises, for each predetonation tube, two diametrically opposed igniter plugs.

4. The engine as claimed in claim 1, wherein, on each side of said ignition unit, in zones adjacent thereto, the blockage ratio is high, of the order of 0.58 or higher.

5. The engine as claimed in claim 1, wherein, in the zones adjacent to the opposite end and the facing end of each predetonation tube, the blockage ratio is low, of the order of 0.25.

6. The engine as claimed in claim 4, wherein, between the zones adjacent to said ignition unit and the zones adjacent to the opposite end and the facing end, the blockage ratio is medium, of the order of 0.44.

7. The engine as claimed in claim 1, wherein it comprises two predetonation tubes in lateral positions that are diametrically opposed with respect to said combustion chamber.

* * * * *